United States Patent
Leblond

(10) Patent No.: US 10,341,899 B2
(45) Date of Patent: *Jul. 2, 2019

(54) CONNECTION NODE PROVIDING SUPPLEMENTAL BANDWIDTH FOR MOBILE UNITS

(71) Applicant: Leverage Information Systems, Inc., Woodinville, WA (US)

(72) Inventor: Raymond G. Leblond, Riverside, CA (US)

(73) Assignee: Leverage Information Systems, Inc., Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,079

(22) Filed: Apr. 20, 2018

(65) Prior Publication Data

US 2018/0249369 A1 Aug. 30, 2018

Related U.S. Application Data

(63) Continuation of application No. 15/186,075, filed on Jun. 17, 2016, now Pat. No. 9,955,378, which is a (Continued)

(51) Int. Cl.
| | |
|---|---|
| *H04W 28/02* | (2009.01) |
| *H04W 76/36* | (2018.01) |
| *G08G 1/017* | (2006.01) |
| *G06K 9/00* | (2006.01) |
| *H04W 4/02* | (2018.01) |

(Continued)

(52) U.S. Cl.
CPC .... *H04W 28/0289* (2013.01); *G06K 9/00771* (2013.01); *G08G 1/0175* (2013.01); *H04W 4/02* (2013.01); *H04W 4/021* (2013.01); *H04W 12/06* (2013.01); *H04W 76/36* (2018.02); *H04W 84/06* (2013.01)

(58) Field of Classification Search
CPC ......... G06F 17/30017; G06F 17/30781; G06F 17/30817; G06F 17/3089; G06Q 10/087; G06Q 10/10; G06Q 10/00
See application file for complete search history.

(56) References Cited

U.S. PATENT DOCUMENTS

| | | | |
|---|---|---|---|
| 8,175,532 B2* | 5/2012 | Nanda .................... | H01Q 1/246 343/757 |
| 2003/0061621 A1* | 3/2003 | Petty ................ | G08B 13/19656 725/105 |

(Continued)

*Primary Examiner* — James J Yang
(74) *Attorney, Agent, or Firm* — Lowe Graham Jones PLLC

(57) ABSTRACT

A connection node provides a high bandwidth connection on demand to mobile units that are in need of increased bandwidth for data transfers. In this manner, the connection node can supplement the bandwidth available to a mobile unit so that large volumes of data can be communicated to and from the mobile unit. A movable antenna automatically focuses its reception area on the mobile unit's location, after which, a high bandwidth connection can be established for high-speed data transfer. The high bandwidth connection is maintained, such as by tracking the mobile unit with the antenna, even if the mobile unit is moving.

16 Claims, 6 Drawing Sheets

Related U.S. Application Data continuation of application No. 13/549,369, filed on Jul. 13, 2012, now Pat. No. 9,396,652, which is a continuation-in-part of application No. 12/883,754, filed on Sep. 16, 2010, now Pat. No. 9,786,164, which is a continuation-in-part of application No. 12/154,477, filed on May 23, 2008, now Pat. No. 9,035,768.

(60) Provisional application No. 61/243,311, filed on Sep. 17, 2009.

(51) Int. Cl.
*H04W 4/021* (2018.01)
*H04W 12/06* (2009.01)
*H04W 84/06* (2009.01)

(56) References Cited

U.S. PATENT DOCUMENTS

| | | | |
|---|---|---|---|
| 2006/0290472 A1 | 12/2006 | Onderko et al. | |
| 2008/0224853 A1* | 9/2008 | Patel | G06Q 10/06 340/539.13 |
| 2009/0170475 A1* | 7/2009 | Ch'ng | H04W 12/02 455/411 |
| 2010/0034133 A1* | 2/2010 | Marom | H01Q 1/1257 370/315 |

* cited by examiner

CONNECTION NODE PROVIDING SUPPLEMENTAL BANDWIDTH FOR MOBILE UNITS

PRIORITY CLAIM

This application is a continuation of U.S. patent application Ser. No. 15/186,075, titled Connection Node Providing Supplemental Bandwidth for Mobile Units, filed Jun. 17, 2016; which is a continuation of U.S. patent application Ser. No. 13/549,369, titled Connection Node Providing Supplemental Bandwidth for Mobile Units, filed Jul. 13, 2012, now U.S. Pat. No. 9,396,652; which is a continuation-in-part of U.S. patent application Ser. No. 12/883,754, titled Automated Camera Response in a Surveillance Architecture, filed Sep. 16, 2010, now U.S. Pat. No. 9,786,164; which is a continuation-in-part of U.S. patent application Ser. No. 12/154,477, titled Peer to Peer Surveillance Architecture, filed May 23, 2008, now U.S. Pat. No. 9,035,768; and which claims priority from U.S. Provisional Patent Application No. 61/243,311, filed Sep. 17, 2009, the contents of which applications are hereby incorporated by reference.

FIELD OF THE INVENTION

The invention relates to data transmission systems, and particularly to a connection system providing supplemental bandwidth for mobile units on demand.

BACKGROUND OF THE INVENTION

In today's connected world, data connections are available at a variety of locations. For instance, many establishments provide WiFi access through which a connection to the Internet or other networks can be made. In addition, cellular data providers offer wireless data connections within their coverage areas.

In both cases, bandwidth is limited to the capabilities of the access provider. In addition, in the case of a fixed data access point, a mobile unit can easily move beyond the range of a fixed data access point. Also, cellular data access is known to have areas that have unreliable or no signal availability. These issues are especially problematic in emergency situations where the health or safety of individuals is at risk.

From the discussion that follows, it will become apparent that the present invention addresses the deficiencies associated with the prior art while providing numerous additional advantages and benefits not contemplated or possible with prior art constructions.

SUMMARY OF THE INVENTION

A connection node for providing high bandwidth connections to one or more mobile units is disclosed herein. The connection node is advantageous in that it provides an on demand connection to a mobile unit upon request. This high bandwidth connection can be used to supplement existing data transfer capabilities, such as to transfer large volumes of data from a mobile unit to another location. As will be described further herein, the connection node may target individual mobile units with its antenna when providing a high bandwidth connection.

A connection node may have various configurations. In one embodiment for example, a connection node may comprise a communication device configured to receive one or more requests for a high bandwidth connection. The requests may include location information identifying a location of a mobile unit.

The connection node may also include a transceiver configured to provide the high bandwidth connection to the mobile unit wirelessly, an antenna coupled to the transceiver having a receiving pattern, a motorized mount configured to move the antenna, and a processor configured to control the motorized mount to move the antenna such that the receiving pattern is directed towards the location of the mobile unit. The transceiver may establish the high bandwidth connection with the mobile unit once the receiving pattern is directed toward the location of the mobile unit.

It is noted that the requests may include authentication information and, in such situations, the high bandwidth connection may be provided only upon receipt of valid authentication information. In addition, the communication device may be further configured to receive location updates identifying one or more new locations of the mobile unit. The processor may then control the motorized mount such that the receiving pattern is directed towards the new locations of the mobile unit.

It is contemplated that the communication device may be a wireless communication device communicates via a cellular or satellite network. It is also contemplated that the antenna may be a directional antenna.

Various systems for providing high bandwidth connections are disclosed herein as well. In one embodiment for example, such a system may comprise a management device configured to track a location of one or more mobile units and to receive one or more requests for a high bandwidth connection from the one or more mobile units, and one or more connection nodes.

Each of the connection nodes may comprise a communication device coupled to the communication network, a wireless transceiver configured to provide a high bandwidth connection to one or more mobile units wirelessly, a motorized antenna coupled to the wireless transceiver, and a processor configured to direct the antenna towards a location identified in location information received via the communication device by moving the motorized antenna. The connection nodes may be configured to receive one or more requests for a high bandwidth connection from one or more mobile units through the communication network.

The system may also include a location detecting device at the mobile units. The requests from the mobile units can then include a location of one of the mobile units as determined by their location detecting devices. The system may also include one or more network devices configured coupled to the communication network. The mobile units and the network devices may communicate via the high bandwidth connection.

A video capture device may be at the mobile units. Video captured by the video capture device can then be transmitted from the mobile units to the communication network via the high bandwidth connection. In addition or alternatively, a video display device may be at the mobile units. Video can then be transmitted from the communication network to the mobile units for viewing via the high bandwidth connection.

The management device may be configured to transmit a predefined antenna position to the one or more connection nodes when the one or more mobile units are within one or more predefined geospaces. The connection nodes may then target a geospace by moving their antennas to the antenna position provided by the management device. In addition, the management device may be configured to validate authentication information in the requests before providing the high bandwidth connection. It is noted that the connection nodes may be located at one or more buildings.

Various methods for providing high bandwidth connections to one or more mobile units are disclosed herein as well. For example, in one embodiment such a method may comprise receiving a connection request at a first communication device of a connection node, the connection request including a location of a mobile unit, moving an antenna of the connection node to point a reception pattern of the antenna towards the location of the mobile unit, and validating authentication information in the request. After the authentication information is validated, a high bandwidth connection may be established with the mobile unit through a second communication device of the connection node, with the second communication device being a wireless transceiver coupled to the antenna.

One or more new locations of the mobile unit may also be received. Upon such occurrence, the antenna of the connection node may be moved to point the reception pattern of the antenna towards the new locations of the mobile unit. It is noted that the connection request may be relayed to another connection node if the connection node is unavailable to server the connection request.

The first communication device may be coupled to a communication network comprising one or more network devices. Data may then be transferred between the mobile unit and the network devices via the high bandwidth connection.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the connection node herein provides a persistent high bandwidth connection to one or more mobile units (typically one at a time). As will be described further below, the high bandwidth connection may be requested and thus be provided "on demand." The connection node therefore can supplement any existing data connection that a mobile unit may have. This is advantageous in that it provides capability for high speed data transfer to or from mobile units on an as needed basis. In addition, where an existing data connection is unreliable, damaged, or non-existent, the connection node can provide its high bandwidth connection to the mobile unit.

In one exemplary usage scenario for example, a mobile unit in the form of an emergency vehicle, such as a fire truck, police cruiser, or ambulance (or other vehicle used to provide emergency services), can request and receive a persistent high bandwidth connection to send and receive large amounts of data at high speed. This would allow one or more high quality video streams to be transmitted from the vehicle, be received by the vehicle, or both. It is noted that mobile units may also be personnel, such as police officers or other individuals on foot patrol or the like.

The mobile unit may comprise various equipment that may be configured to communicate via this high bandwidth connection. For example, a mobile unit may comprise or have one or more capture devices, such as sensors, cameras, microphones, and the like. These capture devices may generally be used to gather data from an external source, that may then be transmitted via the high bandwidth connection. Likewise, a mobile unit may comprise various terminals, screens, computing devices, and output or data consumption devices for view/reviewing data received via a high bandwidth connection.

Figure 1:
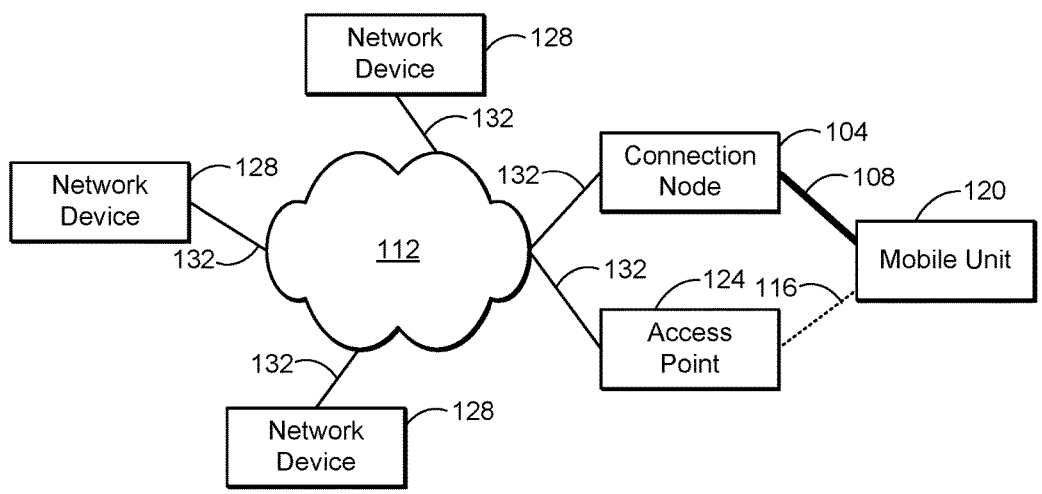
FIG. 1 is a block diagram illustrating a connection node in an exemplary network environment.

FIG. 1 is a block diagram illustrating an exemplary environment of use for a connection node 104. In FIG. 1, a network 112 is shown facilitating communications between various network devices 128 (e.g., servers, clients, network appliances). The network devices 128 may communicate via one or more communication links 132. These may be various wired or wireless communication links utilizing one or more communication protocols.

A wireless access point 124 is also shown in FIG. 1. As can be seen, the wireless access point 124 provides a wireless data connection 116 to a mobile unit 120. The wireless access point 124 may have one or more communication links 132 with one or more networks 112. In this manner, the mobile unit 120 may communicate with various network devices 128 through the wireless access point 124.

The wireless access point 124 will typically utilize traditional wireless data communication technology. For example, the wireless access point 124 may provide wireless cellular or satellite data connections. It is contemplated that the wireless access point 124 could also or alternatively utilize WiFi, but this is less likely (with respect to mobile units) due to the limited range of WiFi.

In contrast to the wireless access point 124, a connection node 104 provides a high bandwidth connection 108 to the mobile unit 120. The high bandwidth connection 108 allows large amounts of data to be transferred between the mobile unit 120 and a network device communicating with the mobile unit. Typically, the high bandwidth connection 108 will provide higher bandwidth capacity than the wireless data connection 116 to increase the data transfer capabilities at the mobile unit 120.

In general, the high bandwidth connection 108 is focused on a limited number of mobile units 120 regardless of their location. For instance, a typical scenario may see the high bandwidth connection 108 of a connection node 104 provisioned for a single mobile unit 120 to increase the data transfer capabilities of that particular mobile unit. This focus allows the bandwidth at the mobile unit 120 to be greatly increased. In addition, since the high bandwidth connection 108 may be requested and provided on demand, mobile units 120 that do not need increased bandwidth may release the connection to allow it to be used by another mobile unit.

In this manner, a connection node 104 may efficiently provide high bandwidth connections 108 for a population of mobile units 120 within a particular area by providing increased bandwidth for only the mobile unit(s) 120 that need/request it. This provides the availability of high bandwidth connections without the cost and effort of greatly increasing the bandwidth of traditional wireless data connections for all mobile units or network end points. Further details regarding how the high bandwidth connection 108 is established will be provided below.

As stated above, the high bandwidth connection 108 is advantageous in that it allows transfer of a large quantity of data to/from a mobile unit 120. In one exemplary embodiment, the high bandwidth connection 108 may be used to transfer captured video and/or audio from a mobile unit 120 to a network device 128 where the video may be viewed, recorded, or both. In addition, the high bandwidth connection 108 may support two-way video allowing personnel at a mobile unit 120 to communicate with other personnel at a videophone, computer (with a camera/mic), or other network device 128 via a live video feed. The personnel at a fixed location (e.g., dispatch center or office) can assist or advise personnel at a mobile unit 120 or vice versa in this manner. It is contemplated that high quality video streams can be carried by the high bandwidth connection 108 to allow high resolution (e.g., high definition) images to be captured and transmitted to and from a mobile unit 120 in real time.

Other types of data may be carried as well. For example, high resolution digital photos, sound recordings, telemetry, sensor data, and the like may be carried to and from a mobile unit 120 via a high bandwidth connection 108.

In some embodiments, a management device 136 may be included to control operation of one or more connection nodes 104. For instance, a management device 136 may be configured to monitor the location of one or more mobile units 120, and the state of one or more connection nodes 104. The management device 136 can then intelligently provision high bandwidth connections to mobile units based on the location of the mobile units 120 and the state of one or more connection nodes 104 within range of the mobile units. For example, the management device 136 may select a connection node 104 that is capable and available to provide a high bandwidth connection to the mobile unit 120 based on the mobile unit's location. It is noted that a management device 136 may comprise or be connected to a storage device for storing location and other information.

For example, the location and reception/transmission range of one or more connection nodes 104 may be stored by the management device 136. This information can then be used to select a connection node 104 that is capable of providing a high bandwidth connection to a mobile unit at a particular location. The management device may also monitor the state of a connection node 104, such as to allow it to select connection nodes that are not currently in use.

It is contemplated that a management device 136 may monitor or track the locations of individual units 120. In one or more embodiments, a mobile unit 120 may report its location to the management device 136 for tracking purposes. Alternatively or in addition, a separate mobile unit tracking system 140 may be used to track the location of mobile units 120. In one or more embodiments, each mobile unit 120 may transmit its location to a management device 136 or mobile unit tracking system 140 to allow the management device or mobile unit tracking system to monitor the location of the mobile units. It is contemplated that this location information may be transmitted periodically, when a mobile unit moves, and/or upon request by a management device or mobile unit tracking system.

As alluded to above, the management device 136 may work in concert with one or more mobile unit tracking systems 140 (in addition or instead of providing its own mobile unit location tracking). This is advantageous in that it permits the management device 136 to interface with existing tracking systems. For example, the management device 136 may obtain location information for particular mobile units from an existing tracking system already configured to track the location of these units.

Figure 2:
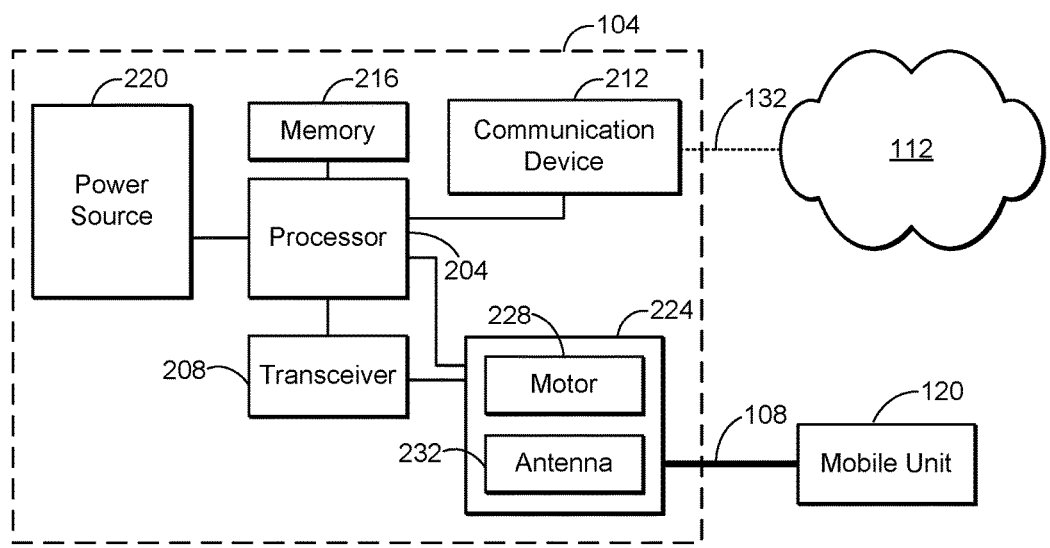
FIG. 2 is a block diagram illustrating components of an exemplary connection node.

An exemplary connection node 104 will now be described with regard to FIG. 2. It can be seen that a node may comprise one or more processors 204 and data storage devices 216. In general, a processor 204 may be configured to control one or more components of the connection node 104 to provide the functionality herein. In one or more embodiments, the processor 204 may execute one or more instructions to provide such functionality. The instructions may be hardwired into a processor 204 in some embodiments. In other embodiments, the instructions may be in the form of machine readable code executable by the processor 204 to provide the functionality disclosed herein. The machine readable code may be retrievably stored on a storage device 216.

A data storage device 216 may also or alternatively be used to store other data, such as data received from a mobile unit, prerecorded data for consumption at a mobile unit (e.g., videos), and data received from network devices. In one or more embodiments, a storage device 216 may be used to record video data received from a mobile unit for instance. It is noted that a data storage device 216 may utilize various storage technologies to record information. For example, a data storage device 216 may be a magnetic hard drive, optical drive, or flash drive. Alternatively, a data storage device 216 may be RAM, ROM, or other memory. It is contemplated that storage technologies, now known and later developed may be used.

A connection node 104 may also have its own power source 220 in one or more embodiments, as was disclosed above. The power source 220 may comprise a battery, generator, or the like. This helps ensure that the connection node 104 can continue to function even if an external power source fails. It is noted however that a power source 220 is optional and need not be included in all embodiments.

As can also be seen, the connection node 104 may include one or more communication devices 212 for communicating with a network 112 and the devices that make up or are connected to the network. In general, a communication device 212 will be used to establish a communication link 132 for such communications and to transmit and receive data across the communication link. For example, a communication device 212 may be a network interface in some embodiments.

One or more transceivers 208 may be included as part of the connection node 104 as well. In general, a transceiver 208 will be configured to provide a high bandwidth connection 108 to a mobile unit 120. A transceiver 208 will typically transmit and receive data wirelessly via a point-to-point connection. In other words, as described briefly above, the transceiver 208 will be configured to establish a high bandwidth connection with a limited number of mobile units 120 (typically one mobile unit) at a time. This will typically be accomplished using a directional antenna 232 to send and receive wireless data transmissions from a particular mobile unit 120.

In one or more embodiments, data transfers from a mobile unit 120 may be received as a unicast transmission and subsequently processed for multicast transmission by a connection node 104. For example, in one or more embodiments, a processor 204 and communication device 212 may be configured respectively to convert data to a multicast stream and transmit the multicast stream to other devices. This is beneficial in that very low latency real time video from the mobile unit 120 to be transmitted to multiple network devices or network nodes (as described below). To illustrate, in one embodiment, a UDP unicast video stream from a mobile unit 120 may be received at the connection node 104 and converted to a UDP multicast stream for distribution to multiple end points (i.e., network devices). In situations where the network devices are connected by low bandwidth connections (e.g., cellular or satellite connections) the conversion to multicast allows video or other data to be efficiently shared. This addresses a significant drawback of cellular (or similar low bandwidth connections) while allowing transmission of video or other large data streams in real time. Real time video/information is especially advantageous to proactive video policing.

An antenna assembly 224 may be used to support and move the antenna 232 so as to target the mobile unit 120 requesting or utilizing the high bandwidth connection 108. For example, the antenna 232 may have a receiving pattern that defines one or more areas (relative to the antenna) where the antenna's gain is greatest or is increased. The antenna assembly 224 may be configured to move the antenna 232 to point or direct the antenna's receiving pattern towards the location of the mobile unit 120 to improve signal transmission/reception.

As can be seen, the antenna assembly 224 may comprise an antenna 232 and a motorized gimbal 228. The motorized gimbal 228 is used to position or orient the antenna 232 such that the antenna can transmit and receive data to/from the location of a mobile unit 120. In one or more embodiments, the motorized gimbal 228 will position the antenna 232 so as to maximize the signal strength in receiving and/or data from the mobile unit 120.

The processor 204 may be configured to determine this ideal position of the antenna 232 based on the location of the mobile unit 120 relative to the connection node. It is noted that the ideal position may also take the type of antenna and/or its capabilities into account. For example a directional antenna 232 may be pointed at the mobile unit's location, while other antennas may be positioned such that they are normal to (i.e., perpendicular to) or at another angle relative to the mobile unit 120. It is contemplated that an antenna 232 may include signal enhancers, such as a parabolic or other dish for example.

It is noted that various devices may be used to position the antenna 232. For example, one or more servos or other motors may be used in addition to or instead of the motorized gimbal 228 to position the antenna 232.

The location of a mobile unit 120 may be determined in various ways. In one embodiment, a mobile unit 120 may determine and report its location to the connection node 104. The mobile unit 120 may utilize a GPS device, cellular tower triangulation, WiFi triangulation, or other location detecting devices to determine its location. In addition, it is contemplated that a "dead reckoning" capability may be built into a mobile unit 120. In this manner, the mobile unit 120 can determine its location based on how far and in which direction it has moved. Once a location is determined, the location may be transmitted from the mobile unit 120 to the connection node 104. For example, referring to FIG. 1, a mobile unit 120 may utilize an existing data connection 116 to transmit its location to a connection node 104. It is contemplated that the mobile unit 120 may also communicate requests for a high bandwidth connection 108 to a connection node 104 via this data connection 116.

Figure 3A:
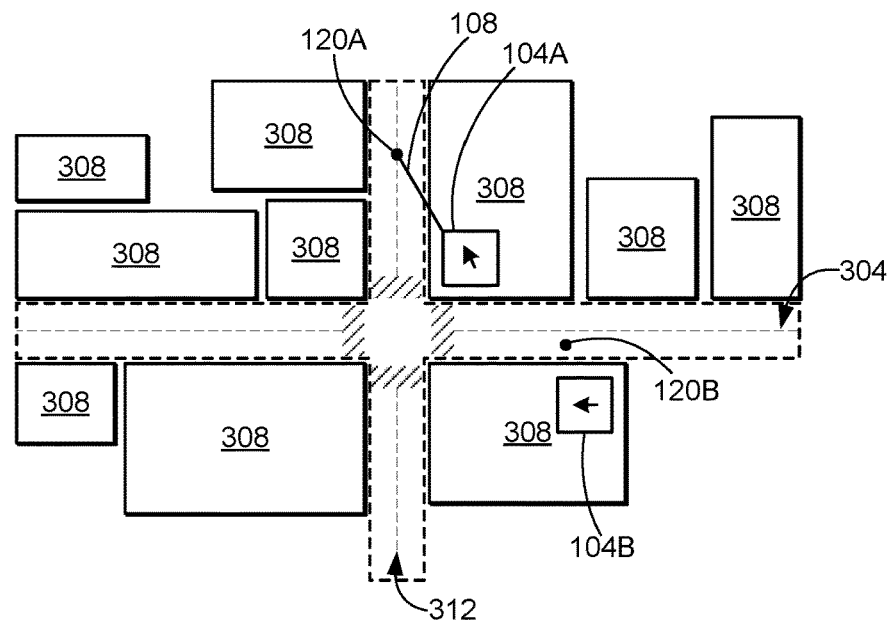
FIG. 3A illustrates connection nodes in operation in an exemplary environment of use.
Figure 3B:
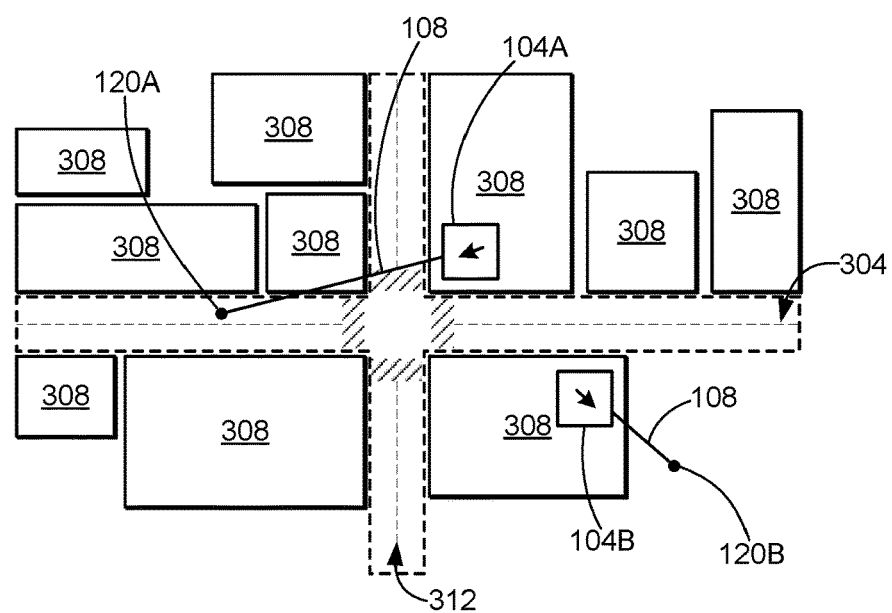
FIG. 3B illustrates connection nodes in operation in an exemplary environment of use.

Operation of exemplary connection nodes 104 will now be described with regard to FIGS. 3A-3B. FIGS. 3A-3B illustrate a real world environment where connection nodes 104 may be used to provide high bandwidth connections 108 to mobile units 120. As shown, the connection nodes 104 are mounted at various buildings 308, though it is noted that a connection node may be mounted to a variety of structures, such as traffic lights, street lights, billboards, towers, and the like. In some embodiments, it may be desirable to locate at least the antenna assembly of a connection node 104 on an exterior wall or other structure so as to reduce the number of obstructions between the antenna assembly and a mobile unit 120. It is contemplated that the antenna assembly may be remote from the remainder of the connection node 104 in some embodiments. For instance, the antenna assembly may be on the exterior of a building 308 (or other structure) and connected to the remainder of the connection node 104 inside the building via one or more cables or the like.

As can be seen, the mobile units 120 are land-based vehicles in the examples of FIGS. 3A-3B. It is noted that the connection node 104 may provide high bandwidth connections to aerial as well as marine vehicles in the manner disclosed herein. FIG. 3A shows the mobile units 120 at first positions, while FIG. 3B shows the mobile units having moved to second positions. FIGS. 3A-3B also show the corresponding activity by the connection nodes 104 used in providing uninterrupted high bandwidth connections to the mobile units 120 even as they move.

Referring now to FIG. 3A, it can be seen that a first mobile unit 120A is moving along a first road 312. The connection node 104A is targeting the first mobile unit 120A with its antenna (as shown by the arrow extending therefrom) thus providing a high bandwidth connection 108 to the mobile unit 120A. Previously, the first mobile unit 120A may have requested the high bandwidth connection 108 by transmitting its location to the connection node 104A, as discussed above. This would cause the connection node 104A to point or target its antenna to provide a high bandwidth connection 108 to the mobile unit 120A, as shown in FIG. 3A. A second mobile unit 120B is on a second road 304 illustrated in FIGS. 3A-3B. As can be seen, the second mobile unit 120B has not requested a high bandwidth connection 108 and no connection node 104 is targeting the second mobile unit 120B.

Referring to FIG. 3B, it can be seen that the first mobile unit 120A has moved through the intersection of the first and second road 312, 304 and down the second road. As the first mobile unit 120A has moved, the connection node 104A continuously tracks it location and targets the first mobile unit by moving its antenna accordingly. In one or more embodiments, this tracking may occur by a mobile unit 104 providing location information as the mobile unit changes location. For example, a mobile unit 120 may continuously or periodically transmit its location to a connection node 104 once a high bandwidth connection is established. The mobile unit 120 could also or alternatively transmit its location to the connection node 104 whenever its GPS or other location detecting device senses a new location for the mobile unit. As stated above, the transmission of location information may occur via an existing data connection. Once a high bandwidth connection 108 is made, location information could also or alternatively be transmitted via the high bandwidth connection.

Since a connection node 104 may specifically target a mobile unit 120 when providing a high bandwidth connection 108, it is noted that an individual connection node may have a large range within which a high bandwidth connection can be established. In some embodiments, a plurality of connection nodes 104 may be linked together to extend the range of a high bandwidth connection. For example, as a mobile unit 120 reaches the extent of one connection node's range, a second connection node 104 (that is preferably closer to the mobile unit) may target the mobile unit 120 to provide a continuous high bandwidth connection.

A protocol by which a high bandwidth connection 108 is transferred from one connection node 104 to another may be defined. For example, a first connection node 104 may query one or more stored records identifying the location of other connection nodes and select another connection node based on that connection node's location relative to the mobile unit 120 and/or that connection node's range. A high bandwidth connection 108 may then be established between the selected connection node 104 and the mobile unit 120, thus transferring the connection from one connection node to another.

FIG. 3B also illustrates provisioning of a high bandwidth connection 108. As can be seen, the second mobile unit 120B now has a high bandwidth connection via connection node 104B. Prior to providing a high bandwidth connection, the connection node's antenna may have been at a default position or simply at the last position at which it was placed, such as shown by the arrow extending from the connection node 104B in FIG. 3A. In FIG. 3B, the mobile unit 120B has reached a parking lot 316 where it now needs a high bandwidth connection 108. As can be seen, the connection node 104B has positioned its antenna to provide such a connection to the mobile unit 104B.

A protocol for selecting a particular connection node 104 to provide a high bandwidth connection may be defined in one or more embodiments. Typically, this will occur in configurations comprising a plurality of connection nodes 104. In one embodiment, such protocol may cause individual connection nodes 104 to relay requests for high bandwidth connections to other connection nodes. An ideal connection node may then be selected to establish a high bandwidth connection with the mobile unit. An ideal connection node may be identified based on distance from the mobile unit, its communication range, or both. In some embodiments, the closest connection node 104 may be selected for example. If the mobile unit 120 should reach the extent of a connection node's range, the high bandwidth connection may be transferred to another connection node, such as described above.

As disclosed in U.S. Patent Publication No. 2011/0013018, which is incorporated herein by reference, an ideal node may be selected based on other factors as well. For example, a connection node 104 may be selected, at least in part, based on its "view" of a mobile unit 120. For example, a different connection node 104 may be selected if there is an obstruction, such as a building or other structure, between the closest connection node and the mobile unit 120. As described in the above-referenced patent publication, a viewable area (i.e., unobstructed area) may be defined for a node and used to select particular nodes based on what areas are viewable to each node. Regarding the connection node 104, it is contemplated that a viewable area may be defined for each connection node. For example, a mapping defining geographic coordinates (i.e., serviceable areas) where a connection node can provide its high bandwidth connection may be provided. This mapping may then be used in selecting an ideal connection node 104 to provide a high bandwidth connection to a mobile unit 120. It is contemplated that the mapping may take altitude or elevation into account to service both land-based and aerial vehicles.

Figure 4:
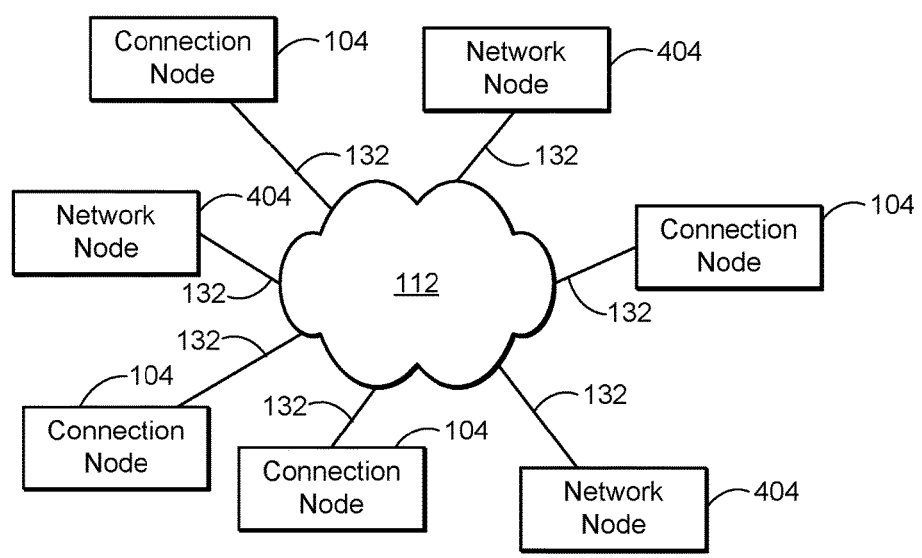
FIG. 4 is a block diagram illustrating connection nodes in an exemplary a peer to peer environment.

FIG. 4 is a block diagram illustrating connection nodes 104 in a peer to peer environment. It is contemplated that a connection node 104 will be capable of functioning independently in an interconnected system of network nodes and/or network devices, such as shown. A connection node 104 may be configured to operate independent of other devices in a variety of ways. For example, a connection node 104 may have its own power source that is used to power the node or as a backup in case its primary power source is no longer available or is insufficient.

In addition, as disclosed in U.S. Patent Publication No. 2009/0289788, which is incorporated herein by reference, a node may utilize a key-based authentication scheme to permit or deny access to the node, should one or more authentication devices, such as server nodes, become unavailable.

For instance, the connection node 104 may be configured to restrict access to its services so that only authorized mobile units are provided a high bandwidth connection 108. In one or more embodiments, the connection node 104 may be configured to provide access upon receiving a valid authorization token from a mobile unit that is requesting the high bandwidth connection.

As detailed in the above-referenced patent publication, the authorization token may be generated by a server or server node and provided to the mobile unit. The mobile unit may then request a high bandwidth connection 108 from a connection node 104 using the authentication token, regardless of whether or not the server or server node that provided the authentication token is operational. A server node may be configured to provide an authentication token to a mobile unit when presented with a valid username and password combination or other valid identification information.

It is noted that an authentication token may also be shared by a connection node 104 with other network devices or nodes 404 to authorize data transfer between the connection node and these other network devices or nodes. For example, one or more of the nodes 404 in FIG. 4 may be content storage nodes or server nodes configured respectively to store and analyze incoming data (such as video) from a mobile unit. One or more of the nodes 404 may be viewing nodes configured to present data to an operator or other personnel via a display screen, speaker, and/or other output device. A connection node 104 may authenticate itself with one or more of these nodes 404 and subsequently transmit and/or receive data to/from these nodes. In this manner, data streams can be transmitted from a mobile unit to a connection node 104 where it can be shared with other nodes 404 in a peer to peer system.

Since, each node 404, including the connection nodes 104, can be configured to operated independently, the individual nodes remain fully functional and accessible even if one or more other nodes are damaged, destroyed, or are otherwise inoperable. This is highly advantageous in surveillance and in situations involving the health and/or safety of individuals, as disclosed in the above-referenced patent publication.

In addition to or instead of an authentication token, it is contemplated that a connection node 104 may be configured to accept and verify a username and password or other valid identification information prior to provisioning a high bandwidth connection to a mobile unit.

Operation of an exemplary connection node will now be described with regard to FIG. 5. At a step 504 the location of a mobile unit may be received by a connection node. The location information may be in the form of coordinates in one or more embodiments, such as a longitude and latitude. An altitude and/or compass heading may be included as well. This allows the connection node to properly pinpoint and target the mobile unit. As disclosed above, the location information may be generated by one or more location detecting devices at a mobile unit, such as a GPS device, signal triangulation device, altimeter, compass, or various combinations thereof.

The location information may be transmitted in or along with a request for a high bandwidth connection. Such request may include authentication information so that the connection node may verify that a mobile unit is permitted to use the connection node's high bandwidth connection. For example, a username/password combination or other identification information may be part of a request. In addition or alternatively, a mobile device may transmit its authentication token to validate its request for a high bandwidth connection.

It is contemplated that the authentication information (or other identification information) may be used to uniquely identify a mobile unit 120. In this manner, if the mobile unit's location is already being tracked, such as by a management device and/or mobile unit tracking system, a request for a high bandwidth connection need not include the location of the mobile unit 120.

At a step 508, the connection node may position its antenna to target the location specified in the location information. As stated above, this helps to increase or maximize the signal strength between the mobile unit and the connection node. In one or more embodiments, positioning of the antenna involves moving the antenna with one or more motors of the connection node's antenna assembly. Once properly positioned, a high bandwidth connection with the mobile unit may be established at a step 512 by communicating with the mobile unit via the connection node's transceiver.

At a step 516, data transfer may occur through the high bandwidth connection. As disclosed above, some exemplary types of data that may be shared via the high bandwidth connection include, video, audio, photos, prerecorded data files, and sensor telemetry. It is noted that high speed data transfer may occur in a two-way fashion, as also disclosed above.

Figure 5:
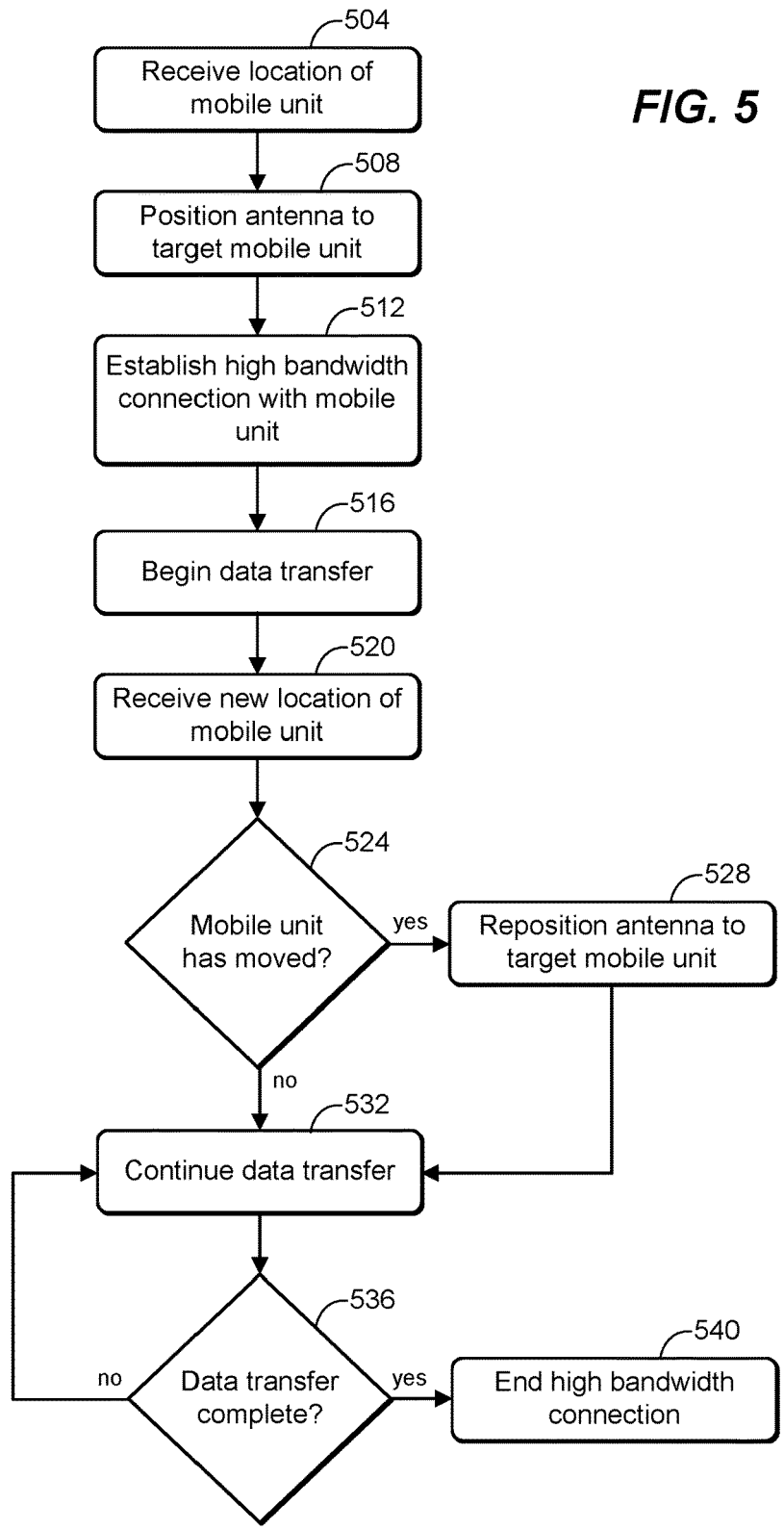
FIG. 5 is a flow diagram illustrating operation of an exemplary connection node.

As shown by step 520 in FIG. 5, additional location information may be received by the connection node after a high bandwidth connection has been established. At a decision step 524, it may be determined if the new location information indicates that the connection node's antenna should be repositioned. For example, if the location information shows the mobile unit has moved, the connection node may reposition its antenna accordingly at a step 528. Data transfer continues seamlessly during and after this repositioning, such as shown at a step 532. If no repositioning is desired or necessary, data transfer can continue at step 532 as well.

It is contemplated that other events may trigger a repositioning of the antenna. For example, if a decrease of signal strength beyond a predefined threshold is detected, the connection node may reposition its antenna in response. Alternatively or in addition, a loss in signal strength may cause the connection node to request new location information from the mobile unit. This new location information can then be used to reposition the antenna, such as disclosed above.

At a decision step 536, if the high speed connection is no longer needed (i.e., the data transfer(s) are complete), the connection may be ended at a step 540. This frees the connection node to service other mobile units. It is noted that various mobile units may be assigned a priority or specify a priority in their requests for a high bandwidth connection. In such embodiments, a mobile unit having or requesting high bandwidth connection may cause existing lower priority connections to be ended in favor of the higher priority request. For example, an emergency vehicle may be given priority over a surveillance vehicle or other vehicle. In addition or alternatively, an emergency vehicle in an emergency situation may make a higher priority request to help ensure a high bandwidth connection is provided.

Figure 6:
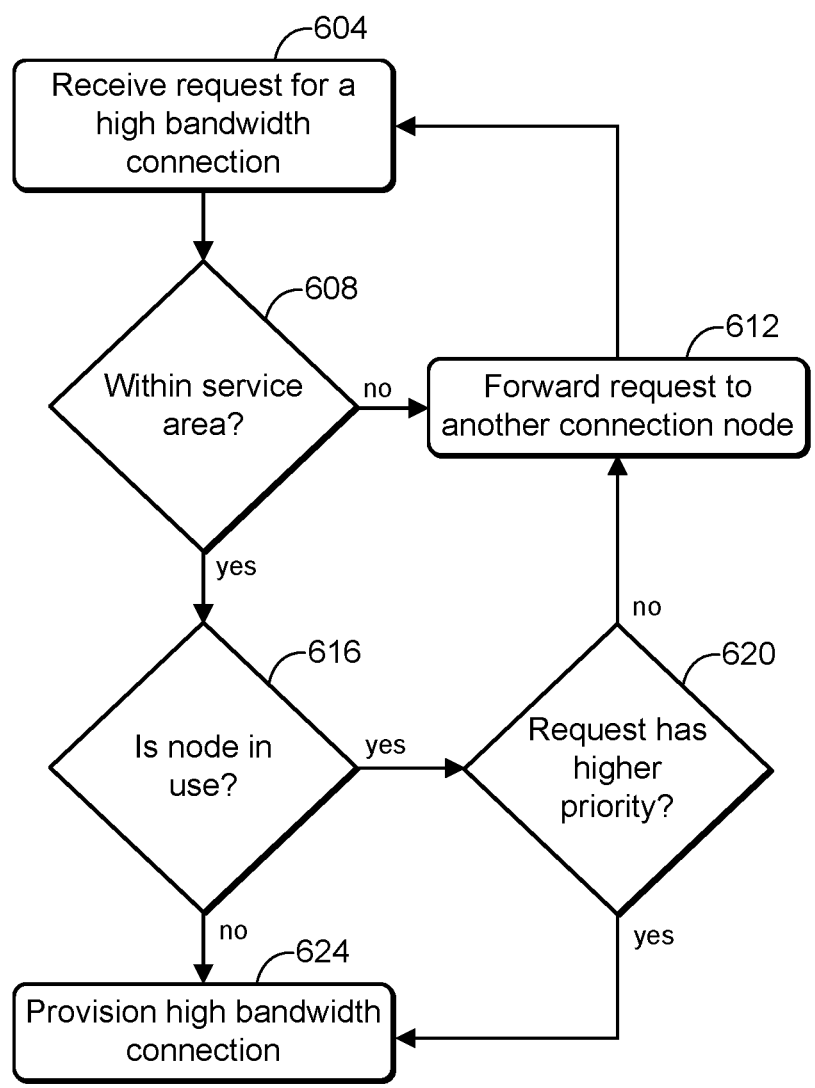
FIG. 6 is a flow diagram illustrating selection of connection node.

FIG. 6 is a flow diagram illustrating the process by which a connection node can be selected for the purpose of providing a high bandwidth connection to a particular mobile unit. Typically, this functionality will be implemented in systems having multiple connection nodes to identify an ideal connection node through which a high bandwidth connection may be provided. In such systems, a request for a high bandwidth connection may be received at various connection nodes and relayed to other connection nodes for provisioning of a high bandwidth connection. In addition, it is noted that other nodes or network devices could be configured to receive a request and relay the request to one or more connection nodes for provisioning.

At a step 604, a request for a high bandwidth connection may be received at a connection node. If, at a decision step 608, the connection node is unable to service the request, the request may be forwarded to another connection node at a step 612. It is contemplated that the request may be forwarded to all other connection nodes or particular node(s) based on their location and/or obstruction mapping (i.e., ability to provide a high bandwidth connection to the mobile unit). The process may then return to step 604, to await additional requests.

Generally, determination of whether or not a connection node is able to service a request is based on the location of the mobile unit making the request. For example, if the mobile unit is within range of the connection node's antenna, the request for a high bandwidth connection can be serviced by that connection node. In embodiments utilizing a geographic mapping of serviceable areas, the request may be deemed serviceable if the mobile unit is within a serviceable area as defined in the mapping.

If, at decision step 608, the connection node is able to service the request, it may be determined at a decision step 612 if the connection node is currently in use by another mobile unit. If not, a high bandwidth connection may be provided to the mobile unit at a step 624, such as by targeting the antenna to the mobile unit and establishing the connection (as described above).

If the connection node is in use, the priority of the request may be compared to the priority of the currently established connection at a decision step 620. If the request has a higher priority, the current connection may be ended and a new high bandwidth connection can be established at step 624 in response to the higher priority request. If the request does not have a higher priority, the request may be forwarded to one or more other connection nodes at step 612. It is noted that in some embodiments the notion of priority may not be implemented and, as such, a connection node may simply forward all new requests if it is currently in use.

It is contemplated that in some situations more than one connection node may be able to provide a high bandwidth connection to a particular mobile unit at a particular time. In such cases, the mobile unit may determine which of the connection nodes to use. Such determination may be made randomly or based on various criteria. For example, the connection node having a higher signal strength may be selected by the mobile unit. If a high bandwidth connection is not accepted or explicitly refused by a mobile unit within a predefined period of time, a connection node may be configured to deem itself not in use and thus available to service other requests.

Figure 7:
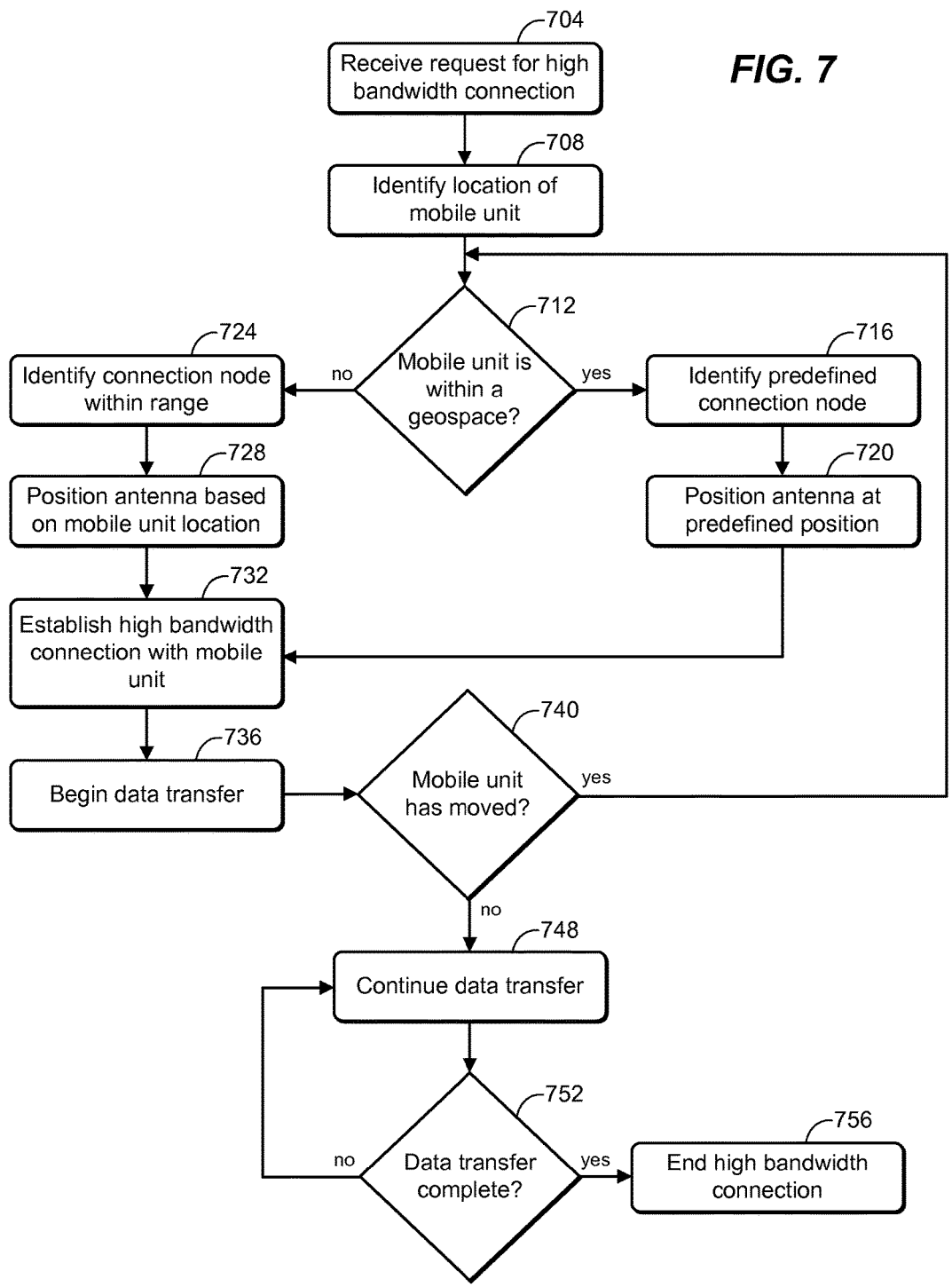
FIG. 7 is a flow diagram illustrating operation of an exemplary management device.

FIG. 7 is a flow diagram illustrating operation of an exemplary management device. As will now be described, in embodiments where a management device is provided, the management device may receive requests for high bandwidth connections and dictate the response to such requests.

At a step 704, a request for a high bandwidth connection may be received. Authentication information may be included in the request to identify the mobile unit requesting the high bandwidth connection. The management device may verify the authentication information to ensure that the high bandwidth connection is provided only to mobile units permitted to have the high bandwidth connection.

The location of the mobile unit requesting the high bandwidth connection may be identified or determined at a step 708. In general, the management device will monitor the locations of mobile units associated to it. As such, the location of the mobile unit may be queried at step 708 from a storage device of the management device using identification information gleaned from the request for the high bandwidth connection.

At a decision step 712, it may be determined if the location of the mobile device is within one or more predefined geographic spaces, or geospaces. The concept of a geospace is defined in U.S. Patent Publication No. 2011/0013018, which is incorporated herein by reference. In general, a geospace is a physical area that may be defined by a user operator, or other personnel using or configuring the management device.

With regard to the connection nodes disclosed herein, geospaces may be stored on a storage device associated with a predefined antenna position for one or more connection nodes. Typically, the predefined antenna position is such that an antenna at that position will be able to provide a high bandwidth connection at any location within the geospace. This includes taking any obstructions into account.

If the mobile unit is within a geospace at decision step 712, a connection node previously associated with that geospace may be identified by the management device at a step 716. The antenna of the connection node may then be moved to the predefined antenna position associated with the geospace at a step 720. The management device may transmit the antenna position to the connection node, or transmit one or more instructions to position the antenna at this position to the connection node to accomplish this. The connection node would then be ready to provide a high bandwidth connection to the mobile unit (or any mobile unit within the geospace), such as shown at a step 732.

It is noted that multiple connection nodes may be associated with a geospace. Each associated connection node may have its own predefined antenna position configured to allow the connection node to service that geospace.

One benefit of predefined geospaces is that connection nodes can be specifically configured to service particular physical areas. For example, certain connection nodes may have faster connections to a particular network device or network node. As such, these connection nodes may be more desirable in certain situations. Using predefined geospaces, such connection nodes may be tasked to provide high bandwidth connections requested from certain geospaces.

If the mobile unit is not within a geospace, the management device may attempt to identify a connection node that is capable of providing a high bandwidth connection to the mobile unit at a step 724. This may occur by the management device querying its records for a connection node that is within range of the mobile unit. Once such a connection node is identified, its antenna may be targeted at the mobile unit at a step 728. A high bandwidth connection may then be established at step 732. In this manner, a management device can service requests for high bandwidth connections even when no geospace covers a mobile unit's current location. It is noted that the management device may determine the antenna position, or the connection node may do so at step 728, such as disclosed above.

Once a high bandwidth connection has been established, data transfer to/from the mobile unit can begin at a step 720. At a decision step 740, the management device may determine if the mobile unit has moved. If not, the data transfer may continue at a step 748, until it is complete as determined at a step 752. The high bandwidth connection may be ended or terminated at a step 756 once data transfer is complete.

If the mobile unit has moved, the management device may proceed back to decision step 712, where either a predefined or determined antenna position may be used to continue the high bandwidth connection depending on whether or not the mobile unit is still within a geospace.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement. Also, while the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A connection node comprising:
   a communication device configured to receive from a mobile unit a request for a high bandwidth connection, the request including location information identifying a location of the mobile unit;
   a transceiver configured to provide the high bandwidth connection to the mobile unit wirelessly;
   an antenna having a receiving pattern, the antenna coupled to the transceiver;
   a motorized mount configured to move the antenna; and
   a processor configured to:

determine, based on the location information identifying the location of the mobile unit, whether or not the connection node is able to service the request for a high bandwidth connection;

if the connection node is not able to service the request, select a second connection node from multiple connection nodes, based on a viewable area defined for each of the multiple connection nodes, wherein the viewable area is an unobstructed area that is viewable to the connection node, in which the connection node can provide its high bandwidth connection; and forward the request to the selected second connection node;

receive location updates identifying one or more new locations of the mobile unit; and control the motorized mount such that the receiving pattern is directed towards the on or more new locations of the mobile unit.

2. The connection node of claim 1, wherein the processor is further configured to if the connection node is able to service the request, control the motorized mount to move the antenna such that the receiving pattern is directed towards the location of the mobile unit.

3. The connection node of claim 1, wherein the viewable area is a mapping that includes one or more geographic coordinates, and wherein the processor is further configured to select the second connection node based on the one or more geographic coordinates.

4. The connection node of claim 3, wherein the mapping further includes an elevation.

5. The connection node of claim 1, wherein the communication device is a wireless communication device communicates via a cellular or satellite network.

6. The connection node of claim 1, wherein the antenna is a directional antenna.

7. A system for providing high bandwidth connections comprising:

a management device configured to track a location of one or more mobile units and to receive one or more requests for a high bandwidth connection from the one or more mobile units, each request including location information identifying a location of the mobile unit; and one or more connection nodes in communication with the management device, each of the one or more connection nodes each comprising:

a wireless transceiver configured to provide a high bandwidth connection to the one or more mobile units wirelessly;

a motorized antenna having a receiving pattern, the antenna coupled to the wireless transceiver; and a processor configured to:

determine, based on the location information identifying the location of the mobile unit, whether or not the connection node is able to service the request for a high bandwidth connection;

if the connection node is not able to service the request, select a second connection node from multiple connection nodes, based on a viewable area defined for each of the multiple connection nodes, wherein the viewable area is an unobstructed area that is viewable to the connection node, in which the connection node can provide its high bandwidth connection; and forward the request to the selected second connection node;

if the connection node is able to service the connection request, moving an antenna of the connection node to point a reception pattern of the antenna towards the location of the mobile unit;

in response to a loss in signal strength, request new location information from the mobile unit; and reposition the antenna based on new location information received from the mobile unit.

8. The system of claim 7, wherein the processor of each of the connection nodes is further configured to if the connection node is able to service the request, direct the motorized antenna towards the location of the mobile unit by positioning the motorized antenna such that the receiving pattern is directed towards the location of the mobile unit.

9. The system of claim 7, further comprising a location detecting device at the one or more mobile units, wherein the one or more requests from the one or more mobile units include a location of one of the one or more mobile units.

10. The system of claim 7, further comprising one or more network devices configured coupled to the communication network, wherein the one or more mobile units and the one or more network devices communicate via the high bandwidth connection.

11. The system of claim 7, further comprising a video capture device at the one or more mobile units, wherein video captured by the video capture device is transmitted from the one or more mobile units to the communication network via the high bandwidth connection.

12. The system of claim 7, wherein the management device is configured to transmit a predefined antenna position to the one or more connection nodes when the one or more mobile units are within one or more predefined geospaces.

13. A method for providing high bandwidth connections to one or more mobile units comprising:

receiving from a mobile unit a connection request at a first communication device of a connection node, the connection request including a location of the mobile unit;

determining, based on the location information identifying the location of the mobile unit, whether or not the connection node is able to service the request for a high bandwidth connection;

if the connection node is not able to service the connection request, selecting a second connection node from multiple connection nodes, based on a viewable area defined for each of the multiple connection nodes, wherein the viewable area is an unobstructed area that is viewable to the connection node, in which the connection node can provide its high bandwidth connection; and forwarding the request to the selected second connection node;

if the connection node is able to service the connection request, moving an antenna of the connection node to point a reception pattern of the antenna towards the location of the mobile unit;

validating authentication information in the request; and after the authentication information is validated, establishing a high bandwidth connection with the mobile unit through a second communication device of the connection node, the second communication device being a wireless transceiver coupled to the antenna.

14. The method of claim 13, wherein determining whether or not the connection node is able to service the request for a high bandwidth connection includes determining if the connection node is able to service the request for a high bandwidth connection by determining if the mobile unit is within range of the antenna.

15. The method of claim 13, wherein the request includes a priority, and further comprising:
   determining if the connection node is able to service the request for a high bandwidth connection by determining if the priority in the request is higher than a priority associated with a currently established connection; and
   if the priority in the request is higher than the priority associated with the currently established connection, ending the currently established connection, otherwise forwarding the request to another connection node.

16. The method of claim 13, further comprising:
   querying stored records identifying locations of multiple other connection nodes;
   selecting one of the multiple other connection nodes based on the location of the selected node relative to the location of the mobile unit; and
   transferring the high bandwidth connection to the selected connection node upon establishing a high bandwidth connection between the selected connection node and the mobile unit.

* * * * *

UNITED STATES PATENT AND TRADEMARK OFFICE
CERTIFICATE OF CORRECTION

PATENT NO. : 10,341,899 B2
APPLICATION NO. : 15/959079
DATED : July 2, 2019
INVENTOR(S) : Raymond G. Leblond It is certified that error appears in the above-identified patent and that said Letters Patent is hereby corrected as shown below:

In the Claims

In Column 15, Line 19 (Claim 1), "on" should be --one--.

In Column 15, beginning on Line 34 (Claim 5), "communicates" should be --communicating--.

Signed and Sealed this
Twentieth Day of August, 2019

Andrei Iancu
*Director of the United States Patent and Trademark Office*